INVENTOR.
LESTER K. QUICK

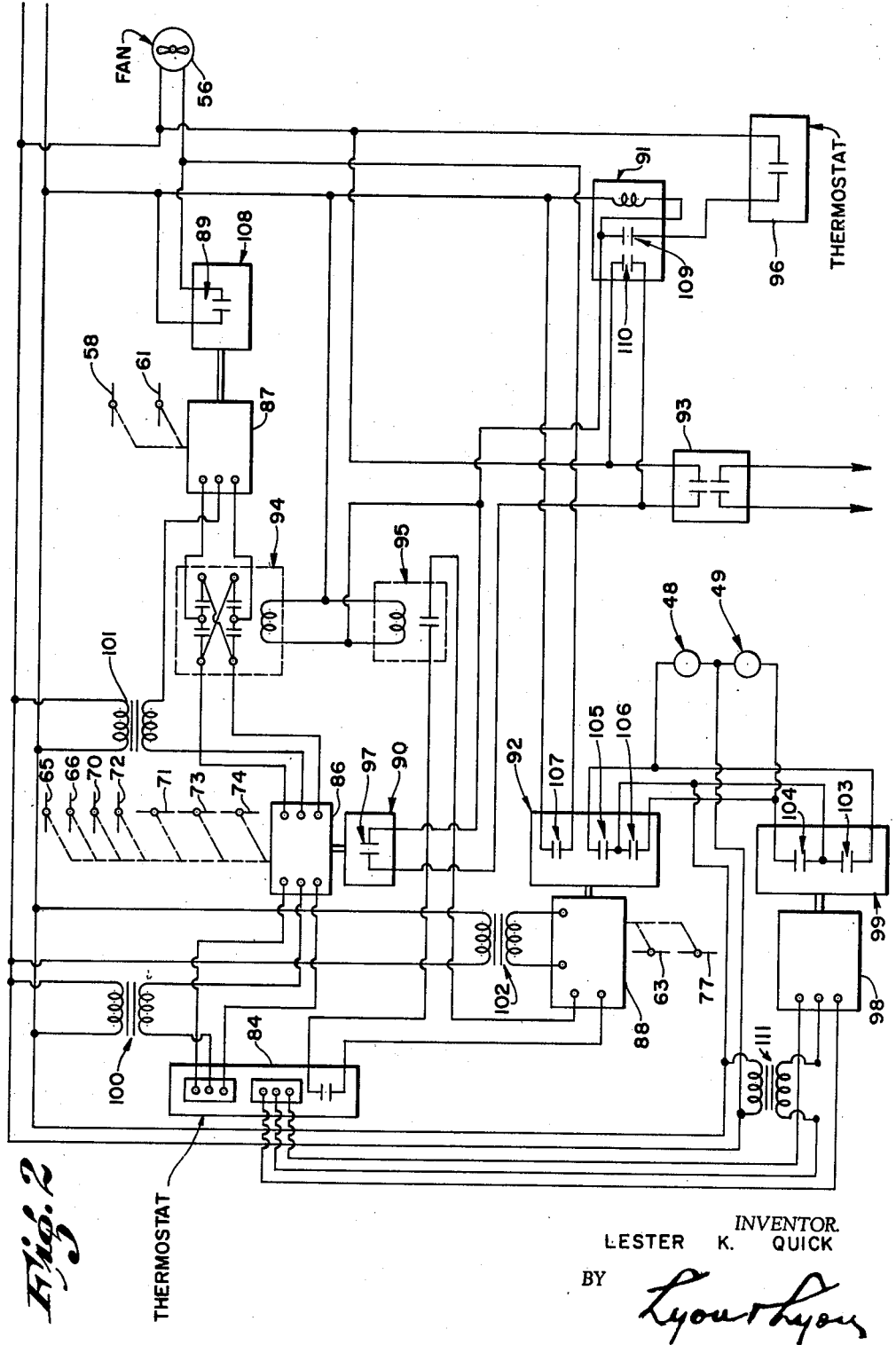

United States Patent Office 3,151,469
Patented Oct. 6, 1964

3,151,469
HEAT RECLAIMING SYSTEM
Lester K. Quick, 795 W. 8th Ave., Eugene, Oreg.
Filed Oct. 2, 1961, Ser. No. 142,315
15 Claims. (Cl. 62—159)

This invention relates to a system for air conditioning and heating a building and, in particular, to a system for selectively circulating air taken from inside or outside a building past condensers or evaporators of a refrigeration system to heat or cool the air and discharge same into or outside of the room as required.

In modern stores and supermarkets, it is common to have numerous refrigerated boxes, display cases or cabinets. Generally a normal refrigeration cycle and equipment is employed for maintaining the proper temperature in such boxes, cases and cabinets wherein a suitable refrigerant is compressed in a compressor, passes through a condenser where it gives up heat and changes to a liquid, and then is passed through an expansion valve to an evaporator which is positioned within the refrigerated box, case or cabinet to absorb heat and change the refrigerant back to a gaseous state for recompressing, thus completing the cycle. The common practice is to allow the heat given off by the condenser to be discharged as a waste product of the refrigeration cycle.

The air within a store or market is generally circulated and heated or cooled to provide a comfortable condition for customers. This circulating and heating or cooling is usually accomplished by apparatus completely separate from and independent of the equipment used for accomplishing the refrigeration of boxes, display cases or cabinets within the same store or market.

Accordingly, it is a principal object of this invention to provide a novel system for circulating, heating and cooling the air within a building wherein the heating or cooling is accomplished by the apparatus of the refrigeration system within that building.

Another object of this invention is to provide a novel system for circulating, heating and cooling the air within a building wherein air may be circulated past the condensers of the air cooling system and the refrigeration system within the building and discharged into or outside of the building as heating is needed.

A further object of this invention is to provide a novel system for circulating, heating and cooling the air within a building wherein the heat pump system for cooling the air also may be used for heating the air or as a part of the refrigeration system for refrigerating boxes or cases within the building.

Another and more detailed object of this invention is to provide a novel system for circulating, heating and cooling the air within a building in which a heat pump system, the condenser for the refrigeration within the building, air circulating fans, and appropriate ducting and dampers are all provided in one assembly for taking air from inside or outside the building and discharging such into or outside the building as conditions require.

Other and more detailed objects and advantages of this invention will appear from the following description and the accompanying drawings.

FIGURE 2 is a schematic illustration of the electrical temperature regulating controls for the present invention.

Figure 1:
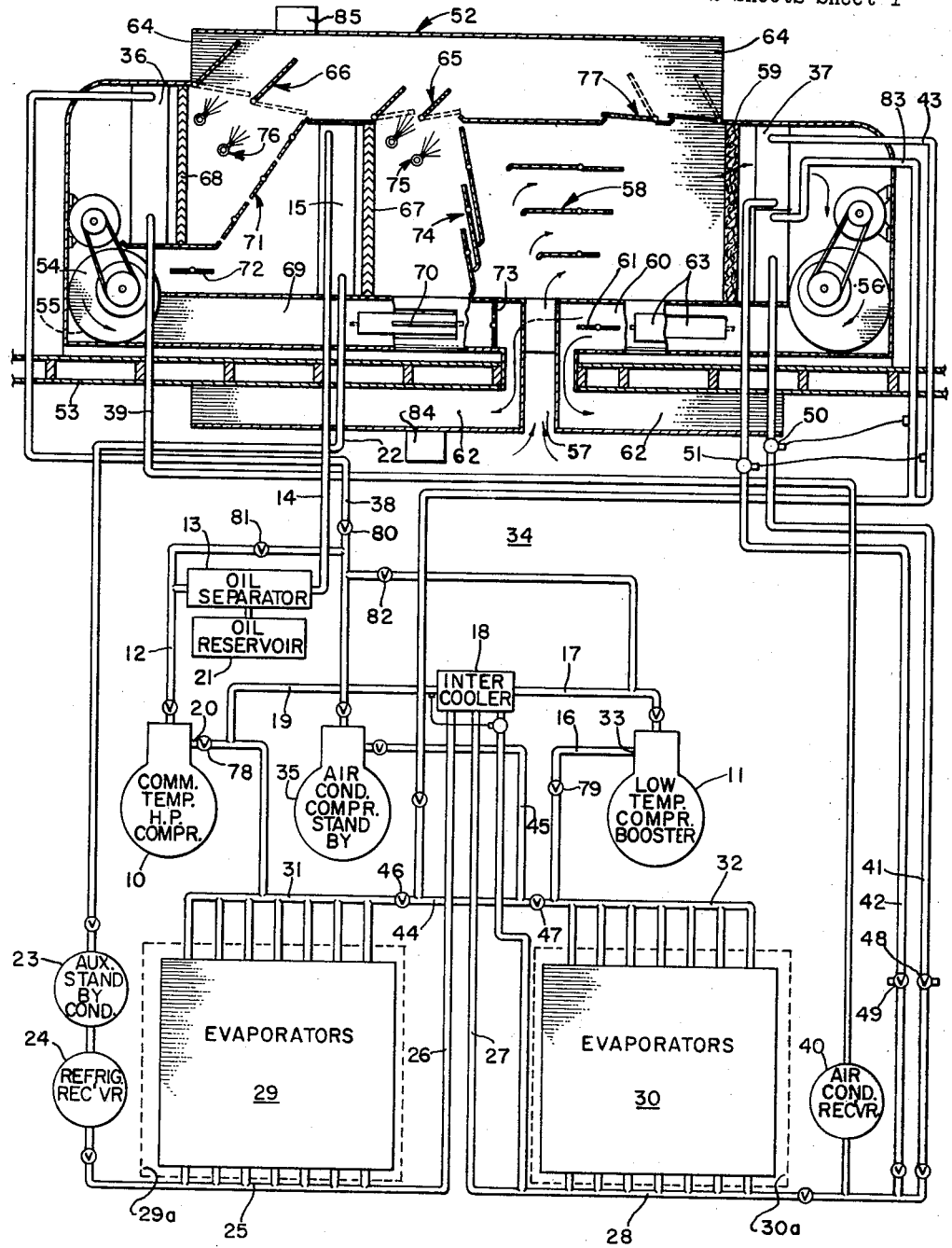
FIGURE 1 is a diagrammatic illustration showing the preferred form of my invention as incorporated within a building containing a refrigeration system.

As found in a normal refrigeration system means are provided for compressing the refrigerant gas and as shown in FIGURE 1 these means may include a commercial temperature compressor 10 and a low temperature compressor 11 for supplying hot, compressed refrigerant gas through conduit 12 to oil separator 13 and thence through conduit 14 to the condenser 15 where it is cooled and condensed to a liquid. Although it is not essential to this invention, I prefer to use the two compressors 10 and 11 rather than only one for increased efficiency. Compressor 11 takes low pressure gaseous refrigerant from conduit 16 and compresses same to an intermediate pressure and temperature which then passes through conduit 17 to the inter-cooler 18 and then through conduit 19 to the intake 20 of compressor 10 where it is compressed to the proper temperature and pressure for condensing. The oil separator 13 serves to remove some oil present within the gaseous refrigerant which was absorbed from the oil within the compressors. The oil thus separated is then retained in oil reservoir 21 for re-use, as desired.

The condensed refrigerant from condenser 15 passes through conduit 22 to the auxiliary condenser 23 where any uncondensed refrigerant gas is condensed, when necessary, and then to receiver 24. The refrigerant then passes through header 25, through conduit 26 to the inter-cooler 18, and through conduit 27 to header 28. From headers 25 and 28 the refrigerant passes through appropriate conduits and expansion valves to evaporators, shown as two banks of evaporators 29 and 30, respectively, positioned within a plurality of boxes, display cases and cabinets diagrammatically illustrated by phantom lines 29a and 30a, respectively, to absorb heat therefrom. The expanded-evaporated gas then passes through appropriate conduits to headers 31 and 32 from which it is drawn into the intakes 20 and 33 of the compressors 10 and 11, respectively. Although a refrigeration system of two compressors, one condenser, and numerous evaporators has been shown and described, any combination of compressors, condensers and evaporators could be used to supply the heat given off by condenser 15 which is used in heating the circulating air as hereinafter described.

Means are provided for cooling air to be circulated into the building 34 and as shown in FIGURE 1, these means may include a heat pump system comprised of a compressor 35, a condenser 36 and a double coil evaporator 37. I prefer to use the same type of refrigerant in this heat pump system as is used in the heretofore described refrigeration system so that the compressor and condenser of the heat pump system may be used as booster or auxiliaries for the refrigeration system in the event of breakdown or servicing thereof.

The gaseous refrigerant compressed in compressor 35 passes through conduit 38 to condenser 36, through conduit 39 to receiver 40, through either conduit 41 or conduit 42, as required, to the lower or upper portions, respectively, of the double coil evaporator 37, and then through conduit 43 or 83 to header 44. From header 44 the refrigerant passes through conduit 45 to the intake of compressor 35 to complete the heat pump cycle. When compressor 35 is used as a standby for either compressor 10 or 11 valve 46 or 47 is opened and the refrigerant is permitted to pass through header 31 or 32, respectively, by closing either valve 78 or 79, to the intake of compressor 35 through header 44 and conduit 45. Valve 80 is closed and either valve 81 or 82 is opened to permit flow of compressed refrigerant to the proper conduit. Various valves may be provided in the system for accomplishing the servicing of various components, such as the compressors, and certain of these valves have been identified in FIGURE 1 by the letter "V," but without specific reference numerals. In order to provide only the amount of cooling of the air as it passes over evaporator 37 which is necessary to maintain the proper room temperature, without excessive cycling of the heat pump system, the evaporator 37 is divided so that it may be operated at two different capacities by opening either one solenoid or both solenoid valves 48 and 49 to allow refrigerant to pass through conduit 41 or 42, respectively, to expansion valve 50 or 51, respectively, through the evaporator 37, and then through either conduit 43 or 83 to header 44.

Means are provided for effecting the desired circulation of air to and from the building and past the condensers 15, 36 and evaporator 37 and, as shown in FIGURE 1 of the drawing, these means may include a housing, generally designated 52, which may be mounted on the roof 53 of the building 34 and in which the condensers 15 and 36, evaporator 37, and fans 54, 55 and 56 are mounted. Fan 55 is mounted behind fan 54 in the drawing and functions in parallel therewith as hereinafter described. Various dampers are provided in the housing 52 for varying the path of circulating air as desired. Each of the dampers is operated by suitable motor means, shown in FIGURE 2, which are controlled by a thermostatic control 84 associated with the building and the opening and closing of each is co-ordinated to produce the desired circulation.

When the air within the building is above the desired temperature range the dampers are in their respective positions illustrated in the drawings. The heat pump system (compressor 35, condenser 36 and evaporator 37) is operated as described and fan 56 functions to draw air from the building 34 through inlet duct 57, past diversion damper 58 which is in open position, through filter 59, past the coils of evaporator 37 where the air is cooled, through duct 60, past supply damper 61 which is in open position, and then back into the building through ducts 62. Exhaust damper 63 in duct 60 is in a closed position to prevent exhausting of cooled air to outside the building and intake damper 77 is closed so that no outside air will be circulated through the air cooling system. Air is circulated past the condensers 15 and 36 by fans 54 and 55 to absorb heat and thereby condense the refrigerant. The air is drawn from outside the building through inlets 64 in the housing, past dampers 65 and 66 which are in open position, through filters 67 and 68, respectively, past the coils of condensers 15 and 36, respectively, through duct 69, and then exhausted to outside the building through damper 70 which is in open position. Dampers 71 are closed and damper 72 is open so that the air passing through condenser 15 does not also pass through condenser 36 which would cause condenser 36 to operate at an undesirable higher temperature. Damper 73 is in a closed position to prevent the warm air in duct 69 from passing through the ducts 62 into the building space or room being cooled. The diversion dampers 74 are closed for diverting the return air from the building to the air conditioning condenser 37 thereby restricting the air supplied to condensers 15 and 36 to air taken from outside the building. When the outside air temperature is relatively high an outside thermostatic control 85 operates to turn on the water to spray nozzles 75 and 76 near the dampers 65 and 66, respectively, thereby causing evaporative cooling of the incoming air to permit operating the condensers 15 and 36 at optimum temperatures. The filters 67 and 68 then also function as eliminators to extract excess moisture from the air so that it is not deposited on the coils of the condensers.

When air within the building is below the predetermined desirable temperature range the dampers 58, 65 and 66 are closed and dampers 74 are opened so that fan 54 draws air from the building 34, through inlet duct 57, past dampers 74 through filter 67 and condenser 15, past damper 72, through duct 69, past damper 73 which is now in an open position, and into building 34 through ducts 62. Damper 70 is closed to prevent exhausting warm air to the outside and damper 61 is closed to prevent reverse circulation through the air cooling system. If the heat thus obtained from condenser 15 is insufficient to raise the room temperature to the desired level, the heat pump system is also operated. Dampers 71, 63 and 77 are opened and damper 72 is closed. Fan 54 is operated so that air is drawn from the building through condenser 15 and then through condenser 36 and discharged into the building through ducts 62. Fan 56 is operated to draw air from outside the building through inlets 64, past dampers 77, through evaporator 37 which operates as a heat pickup coil to take heat from the air, through duct 60 and then is exhausted to outside the building past dampers 63. Although it is not essential to the operation of this system, I prefer to operate the two fans 54 and 55 in parallel to draw air past condensers 15 and 36 for optimum efficiency when evaporator 37 is being used to cool the building. And further so that when only condenser 15 is in use or when condensers 15 and 36 are both in use for heating the building only one fan need be operated since during operation of only the refrigeration system or during heating of the building by both condensers a large volume of air is not needed for the proper operation of the condensers or the proper heating of the building.

In either the heating or cooling of the circulating air the appropriate dampers 65 or 77, respectively, which are normally closed during that operation may be opened to admit fresh air if a change of air within the building is desired.

The dampers 65, 70, 73 and 74 may be modulated to partially opened and partially closed positions by appropriate mechanical or electrical means shown in FIGURE 2, controlled by the heretofore referred to thermostatic control 84 when the air temperature and condition within the building and the outside air temperature are such that it is desirable to draw some air from both inside and outside the building and discharge only part of the heated air back into the building. Further, when the air so discharged into the building is of an insufficient quantity to provide the proper circulation of air within the building, such as for example, if damper 73 were 90% closed and damper 70 were 90% open, then dampers 58 and 61 may be opened and fan 56 operated to draw air from the building and recirculate same back into the building. This opening of dampers 58 and 61 and starting of fan 56 may be actuated by a switch, hereinafter described with respect to FIGURE 2, associated with dampers 70, 73, or 74 which is set to function at a desired predetermined position of dampers 70, 73, or 74 such that adequate circulation within the building is always maintained. In such circumstances, the evaporator 37 is not operated and thus there is no cooling of the air circulated by fan 56. In the normal modulating of dampers 65, 70, 73 and 74 for the purposes described, dampers 73 and 74 will be opened substantially the same amount so that substantially the same volume of air will be discharged into the building through damper 73 as the volume drawn from the building through dampers 74. Dampers 65 and 70 are modulated inversely with dampers 74 and 73, respectively, such that for example whatever percent damper 65 is "open" the damper 74 is that same percent "closed."

When the coils of evaporator 37 begin to accumulate frost, such as during the heating of the building when the evaporator 37 is being used as a heat pickup coil, such coils are defrosted by circulating heated air past same for a short time as follows: dampers 58, 61, 71, 73 and 74 are all opened: dampers 63, 65, 66, 70, 72 and 77 are all closed; fan 56 is turned off; and fan 54 is operated to draw some air from the room and some air through evaporator 37 in a reverse direction, through condensers 15 and 36 to heat the air, through ducts 69 and 60, past fan 56 in a reverse direction, and past the coils of evaporator 37 to remove the frost.

The thermostatic control 84 that is provided and associated with the interior of the building 34 may be used for controlling the starting and stopping of compressor 35 and fans 55 and 56 as well as controlling the opening and closing of the various dampers so that the appropriate heating or cooling of the building is accomplished as required and without manual attention. Fan 54 is operated continuously during the operation of the refrigeration system.

Referring now to FIGURE 2, a control system for operating the heretofore described mechanisms and apparatus is illustrated. A motor 86 is connected by appropriate linkage means to the heretofore described dampers 65, 66, 70, 71, 72, 73 and 74 for synchronously opening and closing those dampers to achieve the conditions of heating or cooling heretofore described. A motor 87 acting as a slave or follower motor to motor 86 operates dampers 58 and 61. A third motor 88 operates dampers 63 and 77. Four transformers 111, 100, 101 and 102 are connected to the power supply for producing a power supply of 24 volts to motors 98, 86, 87 and 88, respectively. The aforementioned room thermostat 84 is of the conventional type having two potentiometers and one auxiliary contact. The operation of motors 86, 87 and 88 is controlled by thermostat 84 as well as by other hereinafter described means in order to produce the desired positioning of the dampers for the particular condition encountered. An end switch 90 is associated with motor 86 and has contacts 97. An end switch 108 is associated with motor 87 and has contacts 89. An end switch 92 is associated with motor 88 and has three pairs of contacts 105, 106 and 107. When motor 86 has positioned the dampers associated therewith for operation of the entire system on air conditioning of the room air, end switch 90 prevents differential switch 93 from reversing motors 87 and 88 that would otherwise occur under particular conditions in a manner hereinafter described. End switch 108 controls the operation of fan 56. Contacts 105 and 106 of end switch 92 close when motor 88 has positioned the associated dampers for operating the heat pump system when operating to produce additional heat for heating the building and the closing of the contacts 105 and 106 opens solenoids 48 and 49 to supply liquid refrigerant to evaporator 37. Under these conditions contact 107 is also closed to operate fan 56. A modulating motor 98 is controlled by thermostat 84 for sequentially closing contacts 103 and 104 of switch 99 to in turn sequentially open solenoid valves 48 and 49 to supply the desired amount of refrigerant to evaporator 37 as required to accomplish the desired cooling during air conditioning of the building. A differential pressure switch 93 is connected in series with the air conditioning compressor control and closes upon an excessive accumulation of frost on evaporator 37 to thereby initiate the defrosting of the evaporator 37 as heretofore described. Closing of switch 93 energizes relay 91, double pole, double throw relay 94, and single pole, single throw relay 95. Relay 94 serves to reverse the operation of damper motor 87, thereby causing heated air to pass over the evaporator 37. Relay 95 over-rides the control of thermostat 84 over motor 88, thereby causing dampers 63 and 77 to open. Thermostat 96 associated with evaporator 37 controls relay 91 by holding contacts 109 and 110 closed to maintain relays 94 and 95 energized until defrosting of the evaporator is completed so that contacts 110 will not be prematurely opened by differential pressure switch 93.

Thus it may be seen from the foregoing that cooling or heating of the building is accomplished as needed and adequate air circulation is consistently maintained without excessive cycling of the equipment provided. When the temperature in building 34 is above the desired range the compressor 35, condenser 36, evaporator 37, and fan 56 are operated with dampers 58 and 61 open and dampers 77 and 63 closed so that air is drawn from building 34 through evaporator 37 for cooling and is discharged through duct 62 into the building. Either solenoid valve 48 or 49 and expansion valve 50 or 51, respectively, are in operation depending on the amount of cooling needed. When the room temperature has been lowered to the desired level the compressor 35, condenser 36 and evaporator 37 are automatically turned off but fan 56 remains in operation to maintain proper air circulation. As the temperature of building 34 drops slightly below the desired range, dampers 74 and 73 modulate to a partially open position and dampers 65 and 70 modulate to a partially closed position so that some air is drawn from the building through dampers 74 by fan 54, past condenser 15 for heating and then some of the heated air is discharged into the building through damper 73. If dampers 74 and 73 are only slightly open fan 56 is still operated to maintain proper circulation within the building. As the temperature drops still lower within the building 34, dampers 74 and 73 modulate open further and dampers 65 and 70 close a like amount to cause more air to be taken from the building, heated, and then discharged back into the building. If sufficient heated air is being discharged into the building to maintain adequate circulation, the fan 56 shuts off and dampers 58 and 61 close. When dampers 74 and 73 are completely open and dampers 65 and 70 are completely closed and the temperature within the building 34 is still below the desired range then compressor 35, condenser 36 and fan 55 are operated with dampers 72 and 66 closed and dampers 71 open to accomplish heating of the circulating air by condenser 36. As heretofore described, dampers 77 and 63 are opened and fan 56 is operated so that evaporator 37 functions as a heat pick-up coil for the condenser 36; the dampers 58 and 61 being closed to prevent undesired discharge of cooled air into the building.

Having fully described my invention, it is to be understood that I do not wish to be limited to the details herein set forth or to the details illustrated in the drawing, but my invention is of the full scope of the appended claims.

I claim:

1. In a heat reclaiming and air conditioning system for maintaining the air temperature in a room within a predetermined range, the combination of: at least two compressors for compressing refrigerant gas, a condenser operatively connected to each compressor for condensing the compressed refrigerant, evaporator means operatively connected to each condenser for evaporating the compressed-condensed refrigerant, means for circulating air past each of said condensers for heating such air, means for selectively admitting such air from inside or outside the room for circulation past said condensers, means for selectively diverting such air circulated past said condensers into or outside of the room, means for circulating air past the evaporator operatively associated with one of said compressors for cooling such air, means for selectively admitting such air from inside or outside the room for circulation past said evaporator, and means for selectively diverting such air circulated past said evaporator into or outside of the room.

2. In a heat reclaiming and air conditioning system for maintaining the air temperature in a room within a predetermined range and for refrigerating boxes, the combination of: a housing, at least two compressors for compressing refrigerant gas, a condenser operatively connected to each compressor for condensing the compressed refrigerant, each of said condensers mounted in said housing, at least one evaporator operatively connected to one condenser and positioned within a box for evaporating the compressed-condensed refrigerant to refrigerate such box, an evaporator mounted in said housing and operatively connected to another condenser for evaporating the compressed-condensed refrigerant, means for returning the evaporated refrigerant to said compressors, means for circulating air past each of said condensers for heating such air, means for selectively admitting such air from inside or outside the room for circulation past said condensers, means for selectively diverting such air circulated past said condensers into or outside of the room, means for circulating air past the said evaporator mounted in said housing for cooling such air, means for selectively admitting such air from inside or outside the room for circulation past said evaporator, and means for selectively diverting such air circulated past said evaporator into or outside of the room.

3. In a heat reclaiming and air conditioning system for maintaining the air temperature in a room within a predetermined range and for refrigerating boxes, the combination of: a housing, at least two compressors for compressing refrigerant gas, a condenser operatively connected to each compressor for condensing the compressed refrigerant, each of said condensers mounted in said housing, at least one evaporator operatively connected to one condenser and positioned within a box for evaporating the compressed-condensed refrigerant to refrigerate such box, an evaporator mounted in said housing and operatively connected to another condenser for evaporating the compressed-condensed refrigerant, means for returning the evaporator refrigerant to said compressors, means mounted in said housing for circulating air past each of said condensers for heating such air, said housing having means for selectively admitting such air from inside or outside the room for circulation past said condensers, said housing having other means for selectively diverting such air circulated past said condensers into or outside of the room, means mounted in said housing for circulating air past the said evaporator mounted in said housing for cooling such air, said housing having means for selectively admitting such air from inside or outside the room for circulation past said evaporator, and said housing having other means for selectively diverting such circulated air past said evaporator into or outside of the room.

4. In a heat reclaiming, refrigerating, and air-conditioning system for maintaining the air temperature in a room within a predetermined range and for refrigerating boxes, the combination of: compressor means for compressing refrigerant gas, condenser means operatively connected to said compressor means for condensing the compressed refrigerant to a liquid, a plurality of evaporator means operatively connected to said condenser means and positioned within said boxes for evaporating the liquid refrigerant to refrigerate said boxes and thereby add heat to said refrigerant, a separate evaporator means operatively connected to said condenser means for evaporating the liquid refrigerant, means for circulating air past said condenser means for heating such air by absorbing the heat extracted from said boxes, means for selectively admitting such circulating air from inside or outside the room, means for selectively diverting such circulating air into or outside the room, means for circulating air past said separate evaporator means for cooling such air, means for selectively admitting such air circulating past the separate evaporator means from inside or outside the room, and means for selectively diverting such air circulated past the separate evaporator means into or outside of the room.

5. The combination of claim 4 wherein the said plural means for selectively admitting and for selectively diverting the air circulated past said condenser means are operatively co-ordinated with the said plural means for selectively admitting and for selectively diverting the air circulated past said separate evaporator means whereby air is drawn from the room and either heated or cooled and then diverted back into the building without mixing with air being circulated past either the condenser means or separate evaporator means whichever is not being used to heat or cool the air drawn from the building.

6. The combination of claim 4 wherein thermostatic control means associated with said room are provided for automatically controlling said plural means for selectively admitting and for selectively diverting air circulated past said condenser means and separate evaporator means whereby the air diverted into the room maintains the air temperature in the room with the predetermined range.

7. The combination of claim 4 wherein the said plural means for selectively admitting and for selectively diverting the air circulated past said condenser means are operatively coordinated with the said plural means for selectively admitting and for selectively diverting the air circulated past said separate evaporator means whereby air is drawn through said condenser means for heating and is passed through said separate evaporator means for defrosting said separate evaporator means.

8. In a heat reclaiming and air conditioning system for maintaining the air temperature in a room within a predetermined range, the combination of: a compressor for compressing refrigerant gas, a condenser operatively connected to said compressor for condensing the compressed refrigerant, evaporator means operatively connected to said condenser for evaporating the compressed-condensed refrigerant, means for selectively circulating and directing air past said condenser or said evaporator means for heating or cooling, respectively, such air, whereby the air temperature in the room is maintained within the predetermined range, and other means for selectively circulating such heated air past said evaporator means for defrosting of said evaporator means.

9. In a heat reclaiming and air conditioning system for maintaining the air temperature in a room within a predetermined range, the combination of: a refrigeration system including a first condenser; a heat pump system including a compressor for compressing refrigerant gas, a second condenser operatively connected to said compressor for condensing the compressed refrigerant, evaporator means operatively connected to said condenser for evaporating the compressed-condensed refrigerant; means for circulating a first air stream past said first condenser for heating such first air and selectively past said second condenser for additional heating of said first air and for circulating a separate second air stream past said evaporator means for cooling such second air, and means for selectively passing said first and second air streams into said room whereby the air temperature in the room is maintained within the predetermined range.

10. The combination of claim 9 wherein means are provided for selectively discharging said first and second air streams to outside of said room.

11. The combination of claim 9 wherein means are provided for selectively admitting air from inside or outside of said room to form said first and second air streams.

12. The combination of claim 9 wherein thermostatic control means responsive to the temperature of said room are provided for automatically controlling the said means for selectively passing said first and second air streams into said room whereby the air having the appropriate temperature is passed into said room to maintain the room within the predetermined temperature range.

13. The combination of claim 9 wherein means are provided for circulating said heated air stream past said evaporator means to defrost said evaporator means.

14. In a heat reclaiming, refrigerating, and air-conditioning system for maintaining the air temperature in a room within a predetermined range and for refrigerating boxes, the combination of: compressor means for compressing refrigerant gas, condenser means operatively connected to said compressor means for condensing the compressed refrigerant to a liquid, a plurality of evaporators operatively connected to said condenser means and positioned within said boxes for absorbing heat from said boxes to evaporate the liquid refrigerant and refrigerate said boxes, separate evaporator means operatively connected to said condenser means for evaporating the liquid refrigerant, and means for selectively circulating air past said condenser means and said separate evaporator for heating or cooling such air, respectively, and for selectively discharging said heated or cooled air into said room whereby the air temperature in the room is maintained within a preselected temperature range.

15. In a heat reclaiming, refrigerating, and air-conditioning system for maintaining the air temperature in a room within a predetermined range and for refrigerating boxes, the combination of: compressor means for compressing refrigerant gas, condenser means operatively connected to said compressor means for condensing the compressed refrigerant to a liquid, a plurality of evaporator means operatively connected to said condenser means and positioned within said boxes for evaporating the liquid refrigerant to refrigerate said boxes and thereby add heat to said refrigerant, a separate evaporator means operatively connected to said condenser means for evaporating the liquid refrigerant, means for circulating air past said condenser means for heating such air, means for circulating air past said separate evaporator means for cooling such air, means for selectively admitting such circulating air from inside or outside the room, and means for selectively diverting such circulating air into or outside of the room whereby the air temperature in the room is maintained within a preselected temperature range.

References Cited in the file of this patent

UNITED STATES PATENTS

| | | |
|---|---|---|
| 1,942,295 | Kerr | Jan. 2, 1934 |
| 2,008,407 | Stoever | July 16, 1935 |
| 2,293,482 | Ambrose | Aug. 18, 1942 |
| 2,481,348 | Ringquist | Sept. 6, 1949 |
| 2,522,484 | Ringquist | Sept. 12, 1950 |